United States Patent [19]

Yeung et al.

[11] Patent Number: 5,641,448
[45] Date of Patent: Jun. 24, 1997

[54] METHOD OF PRODUCING PLASTIC INJECTION MOLDS FOR PROTOTYPE PARTS

[75] Inventors: Millan K. Yeung, Ottawa; William J. Wells, Morewood; Brian K. Bramall, Limoges; Michel V. Laporte, Casselman, all of Canada

[73] Assignee: National Research Council of Canada, Ottawa, Canada

[21] Appl. No.: 613,516

[22] Filed: Mar. 11, 1996

[51] Int. Cl.$^6$ .................. B29C 35/08; B29C 41/02
[52] U.S. Cl. .............. 264/401; 264/129; 264/219; 264/308; 264/328.1; 364/468.26; 364/468.27; 427/133; 427/458
[58] Field of Search ................. 264/129, 219, 264/308, 328.1, 401, 497; 427/133, 458; 364/468.26, 468.27

[56] References Cited

U.S. PATENT DOCUMENTS

| | | | |
|---|---|---|---|
| 5,439,622 | 8/1995 | Pennisi et al. | 264/401 |
| 5,458,825 | 10/1995 | Grolman et al. | 264/401 |
| 5,562,846 | 10/1996 | McKeen | 264/401 X |

*Primary Examiner*—Leo B. Tentoni

[57] ABSTRACT

A process for making a portion of a temporary mold capable of producing several prototype plastic parts, including using computer-aided design to produce a geometric computer model of a prototype part suitable for being molded in plastic, and using this computer model in a rapid prototyping system, such as a stereolithography system, to produce a mold portion from plastic material. The mold portion has an inner surface substantially complementary to an outer surface of the intended plastic part. Solid support is provided for the mold portion to prevent any flexing thereof in later operation. The mold portion inner surface is coated with a layer of metal such as nickel having a thickness of between 75 and 150 μm, which layer has an inner surface adhered to the mold inner surface and an outer surface of the precise shape and dimensions for forming the plastic parts. The mold portion, including its support, is fitted into an injection molding machine, and used to produce the prototype parts at relatively low pressures which do not harm the mold.

20 Claims, 3 Drawing Sheets

METHOD OF PRODUCING PLASTIC INJECTION MOLDS FOR PROTOTYPE PARTS

BACKGROUND OF THE INVENTION

1. Field of the Invention

The present invention relates to the art of injection molding, and especially to the production of prototype parts in the development of new product designs.

2. Prior Art

In the design and development of new plastic products there is often a need to produce a prototype of a part intended eventually to be mass produced by injection molding. The molds typically used in injection molding machines are machined from steel, and this is a slow and expensive procedure if it is intended to produce only a few parts to test a design.

In recent years, one method for making prototype parts cheaply and quickly has been to firstly produce a geometric computer model of the part using computer aided design (CAD). This gives the designer the shape and style of the part. The designer can then go further and use recently developed methods, termed "rapid prototyping systems" or RP systems to convert the geometric computer model into a prototype part. Such rapid prototyping systems include, for example, a so-called "stereolithographic process" using "stereolithographic apparatus" (SLA), or "selective laser sintering", either of which may be referred to as "solid freeform fabrication" (SFF). Various other RP systems have recently become available, and are currently becoming available.

In the SLA system, plastic prototype parts are created from a vat of liquid photocurable polymer by selectively solidifying it with a scanning laser beam. One form of stereolithographic apparatus, or SLA, uses a photosensitive liquid polymer, an x-y scanning ultra-violet laser beam with a 0.25 mm beam diameter, and a z-axis elevator in the vat. The laser beam is focussed on the liquid's surface and cures the polymer, making solid forms wherever the beam is scanned. The depth of the cure is dosage-dependent. The elevator platform is initially positioned at the surface, and as the laser draws a cross-section in the x-y plane, a solid layer is formed on the elevator platform. The elevator is then lowered, and another solid layer is formed on the first. This process is repeated to produce a solid object rising from the elevator platform. To save time, it may be preferred not to fully cure each layer, but to fully cure only the outline of each cross-section and the whole of the bottom and top layers; the internal volume can be cured subsequently under ultra-violet light.

While this SLA system gives an economical way of producing a plastic prototype of a part, such parts are fragile due to the nature of the plastic material, and cannot be tested in an apparatus as though they were functional parts.

It has been proposed in accordance with U.S. Pat. No. 5,439,622 to Pennisi et al. that, instead of using SLA to form the prototype part, this apparatus be used to form mold portions which can then produce prototype parts. In the Pennisi process, the SLA is used to provide a shell defining the inner mold surface, the shell being formed of resinous material of 0.5 to 1.5 mm thickness, and which has some degree of resilience so as to resume its shape after temporary deformation. This shell provides one of the inner faces of the mold portion. It is connected to a "shell base" which forms a cavity with the shell, and this cavity is filled with incompressible material which is said to make the mold portion rigid enough to withstand the forces associated with injection molding. The incompressible material may be high packing density ceramic particles such as silica, alumina, or aluminum nitride. Also, liquids such as water or oil may be used. The cavity is closed by a plug which retains the incompressible material. The shell is coated with a thermally conductive material such as copper or the like, the coating being done by an electroless plating technique, to produce a thin layer of metal about 1–2 μm thick. The metal coating is intended to dissipate heat, which aids in accelerating the molding process.

Two such mold portions are fitted with shoes and placed in an injection molding machine. The mold portions can be used to make plastic bodies having shapes which would prevent their removal from a conventional mold, since such parts can be removed from the Pennisi molds by removing some of the incompressible material to make the mold portions sufficiently flexible that such parts can be removed. Clearly, therefore, the metal coating is intended to be flexible; its purpose is to provide conductivity, and not strength. Also, the incompressible material is intended to be removed and does not solidify.

The Pennisi system has the drawback that, with only a thin layer of metal coating, of 1 to 2 μm thickness, only a few parts can be molded from the from the mold portions before they seriously deteriorate. There is a need for mold parts which are more robust.

SUMMARY OF THE INVENTION

In accordance with the present invention, a process for making a temporary mold capable of producing several prototype plastic parts, comprises:

- using computer-aided design to produce a geometric computer model of a prototype part suitable for being molded in plastic;
- using said computer model to design and produce a geometric computer model of a mold that can be used to produce said part;
- using said computer model of the mold in a rapid prototyping system to produce a mold portion from plastic material, the mold portion having an inner surface substantially complementary to an outer surface of said part, and, simultaneously or subsequently, providing solid support for said mold portion to prevent any flexing of said mold portion in later operations;
- coating the mold portion inner surface with a layer of metal suitable for electro-plating having a thickness of between 75 and 150 μm, which layer has an inner surface adhered to the mold inner surface and an outer surface of the precise shape and dimensions for forming said plastic parts;
- fitting the mold portion, including its support, into an injection molding machine.

The process of the invention may also include producing prototype plastic parts by molding thermoplastic material in said molding machine in successive operations under conditions of temperature and pressure low enough to allow several prototype plastic parts, to produce a coated mold portion to be produced without significant damage to the coated mold portion or changes in its shape or dimensions.

Preferably, the rapid prototyping system is a stereolithography process. The preferred metal for the coating is nickel, although copper or other platable metal may also be used.

The mold portion produced by the rapid prototyping system may include the solid support, this being formed integrally and simultaneously with the mold portion. Alternatively, the mold portion produced by the rapid prototyping system may be a thin shell, and the process may include the step of placing each said shell in an enclosure and back-filling the shell with material which solidifies and forms the solid support. With suitable backing material, this method of construction may provide a mold portion much stronger than one formed entirely by the RP process.

The rapid prototyping system may be used both for producing a mold part having a cavity, and for producing a core, also from plastic material, for use with said mold part. Alternatively, a core formed of metal may be fitted into the molding machine along with said plastic mold portion.

BRIEF DESCRIPTION OF THE DRAWINGS

Preferred embodiments of the invention will now be described by way of example with reference to the accompanying drawings, in which.

DETAILED DESCRIPTION

The development of a new product or component to be molded of plastic in accordance with the invention begins with the use of computer-aided design (CAD) to create a geometric computer model. A suitable CAD tool is that known as "Pro/Engineer". This model is then used as input to another software package called "Pro/Mold" where the core and cavity portions of the mold are designed, and adjusted for shrink allowances of a plastic injection molding process. Both of these software packages are available from Parametric Technology Corporation of Waltham, Mass., U.S.A. Locations for ejector pins that will be used to push the plastic part from the mold after the plastic has been injected into the mold are added. Also, if necessary, cooling lines that are used to keep the mold cool during the injection molding process can be added. This produces computer models of the mold portion or portions.

Each mold portion model is then transmitted to the stereolithography apparatus (SLA) where the mold portion or portions are built using software programs known as WEAVE or TRIHATCH, available from 3D Systems Inc., of California, U.S.A., which has commercialized the SLA system. Supports for the cavities may be created using software from SOLID CONCEPTS INC.

The time taken for producing the mold portions is dependent on their size, but is quite small, say 24 hrs or less, compared to several weeks for making steel molds using conventional methods. The SLA operates largely automatically, so that during its operation the model maker can prepare mold shoes for holding the mold portions, and the ejector pins.

Figure 1:
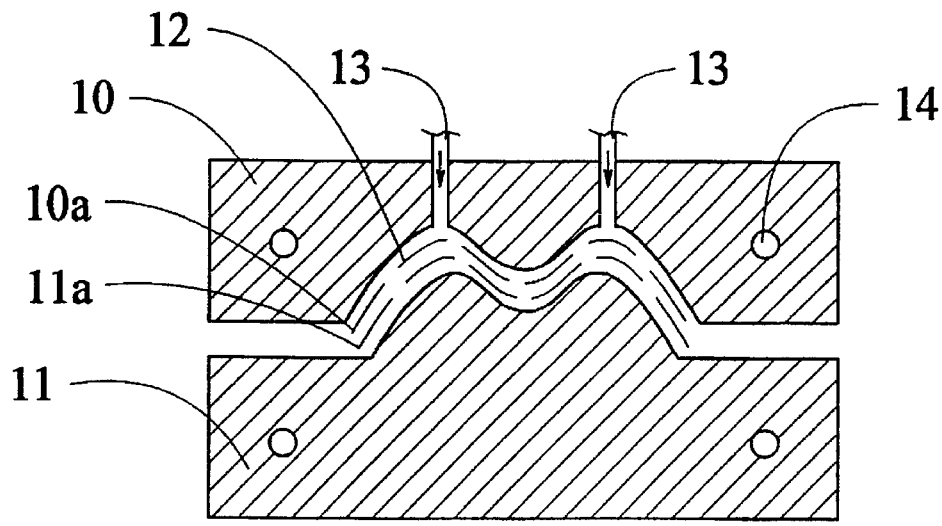
FIG. 1 is a sectional view of two mold portions as initially produced by stereolithography apparatus in accordance with this invention.

FIG. 1 shows upper and lower mold portions 10 and 11 which have been produced from plastics material by SLA so as to have facing inner surfaces 10a, 11a, suitable for molding a prototype plastic part 12 the outline shape of which is shown at 12 in broken lines. The mold portions are integrally formed so as to incorporate support to the inner surfaces, and incorporate bores 13 for ejector pins, and cooling lines 14. The plastic material for the mold portions is acrylic or epoxy resin.

Figure 2:
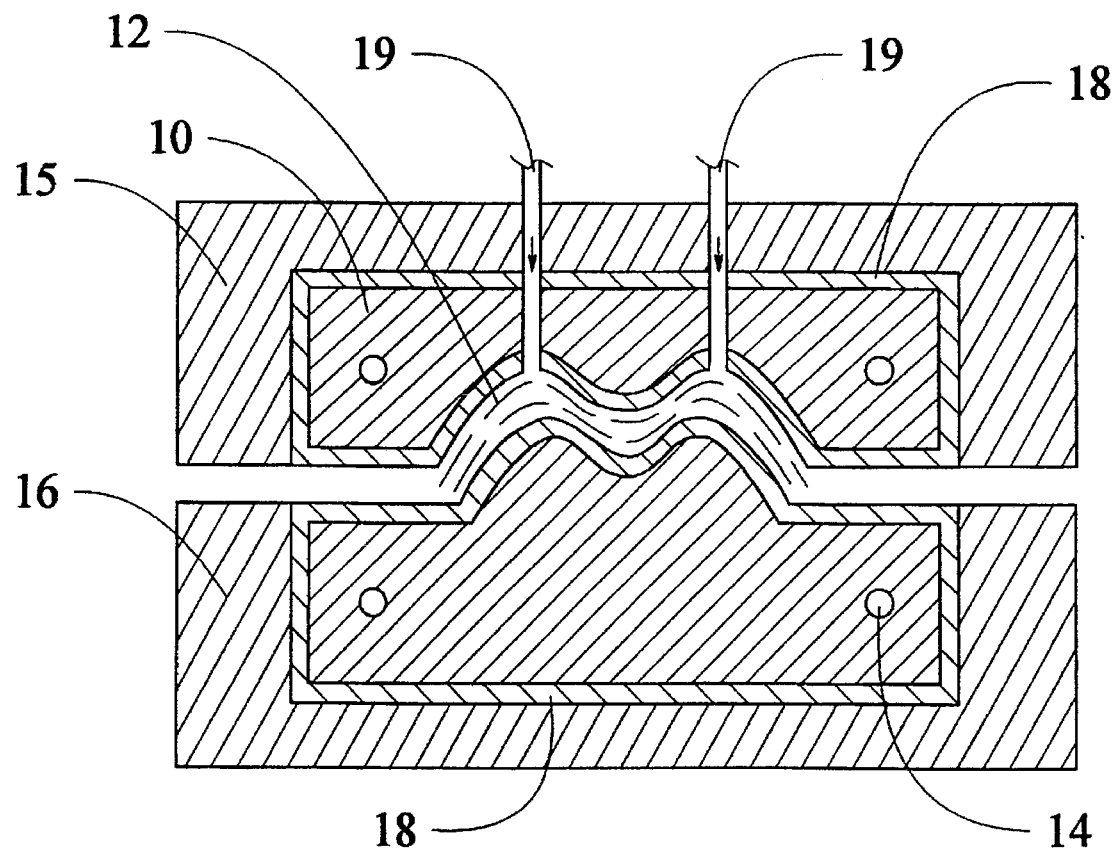
FIG. 2 is a similar view of the completed mold portions assembled in mold shoes.

FIG. 2 shows the completed mold portions, each located within a mold support or shoe 15, 16, and the completed prototype part 12. Prior to being fitted within the shoes, each of the mold portions has been provided with a surface coating 18 of nickel, forming a layer of approximately 125 µm (0.005 inches) in thickness, which is applied by a combination of electroless and electro-plating techniques. More specifically, the procedure for applying the nickel includes firstly electroless plating a coating of even distribution of nickel or copper, followed by electroplating of nickel to the required thickness. This coating serves to increase the strength and wear resistance of the mold portions. Also, ejector pins 19 have been fitted into the bores 13 previously prepared for these and which match bores in the mold shoes.

For the production of the prototype parts of acrylonitrile-butadiene styrene (ABS), the pressure in the injection molding machine is set at 8,000 psi, the holding pressure at 6,000, and the melt temperature at 480° F. These parameters give a relatively low molding pressure at which the plastic material has a low viscosity. To prevent overheating of the mold portions, 2 minutes of cooling time were allowed between successive injections, and air-blasts were used to speed up the cooling time of the mold. Molding in this way requires about 3 min. to produce each part, as compared to about 30 seconds in normal molding. These procedures were intended to hold the temperature inside the mold cavity during molding to between 400° and 600° F., and the pressure in the mold was restricted to a maximum of about 12,000 psi. Fifty prototype parts were produced from this mold. The entire process from the design of the mold to the injection of the fifty parts took only 4.5 days. The saving on cost to build the mold was s much as 80% of the cost if the mold had been built using conventional methods, excluding the mold base which was purchased.

Figure 3:
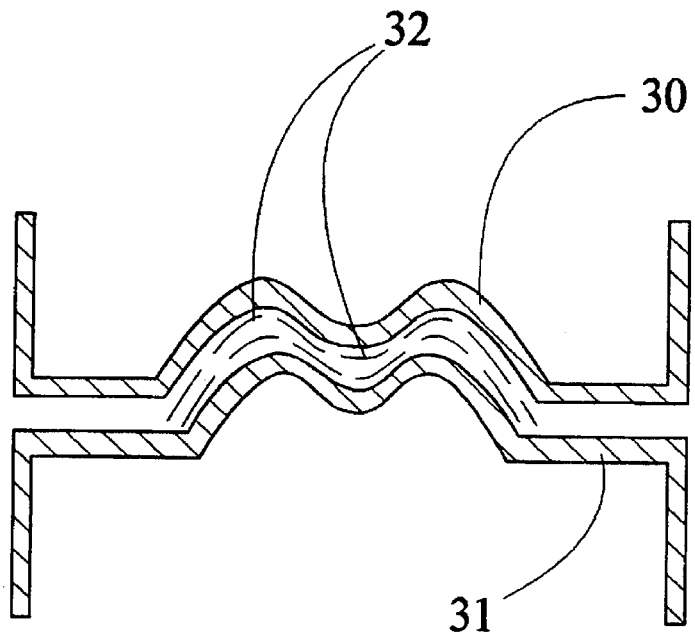
FIG. 3 is a view, similar to FIG. 1, of two shell-type mold portions produced by stereolithography.
Figure 4:
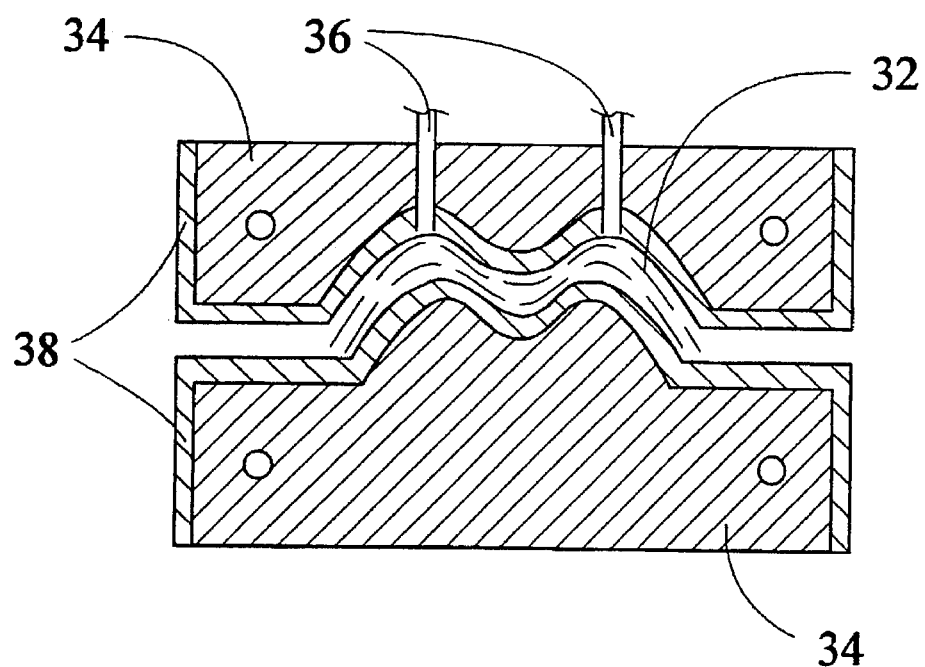
FIGS. 4 and 5 are a views of the mold portions of FIG. 3 being completed and assembled into mold shoes.
Figure 5:
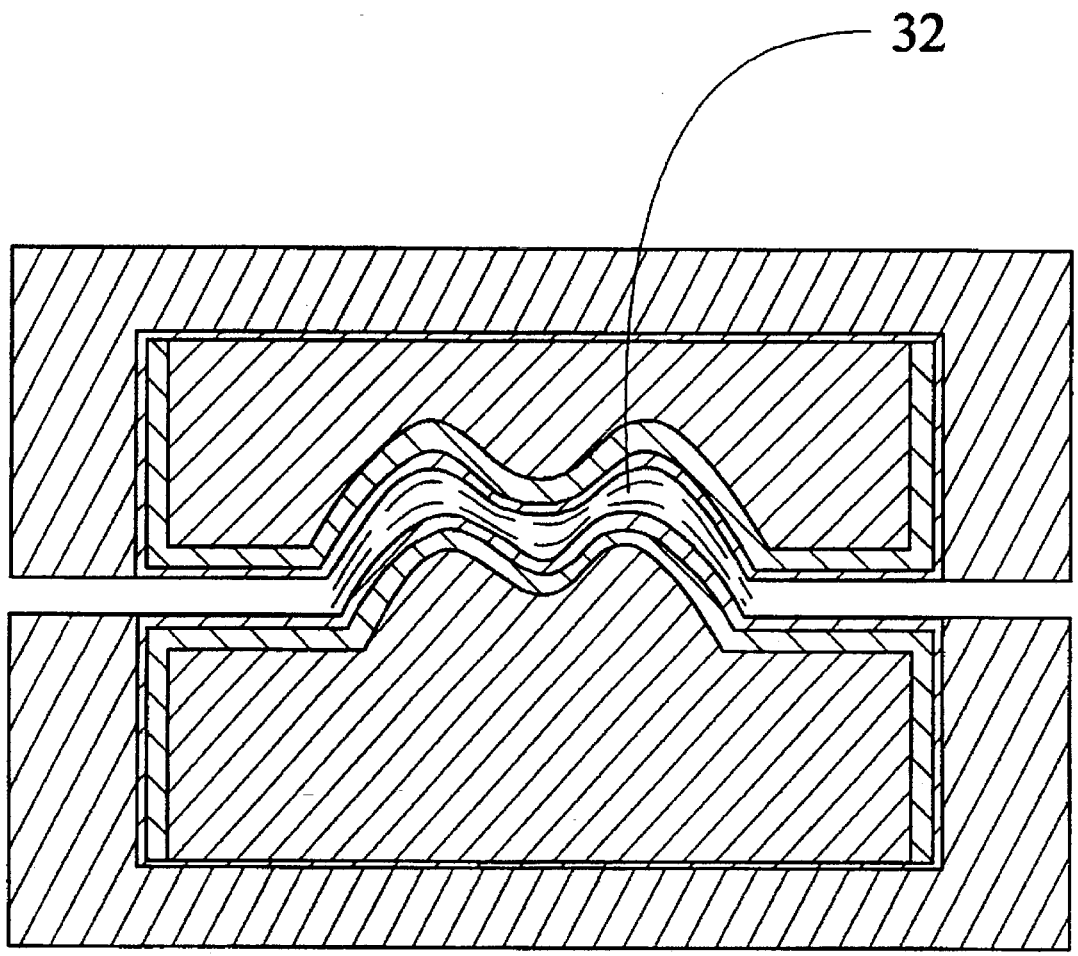

FIGS. 3 to 5 show stages in the production of mold portions, similar to the stages of FIGS. 1 and 2, but in which the mold portions are produced initially in the form of relatively thin shells.

FIG. 3 shows upper and lower thin mold shells 30 and 31 produced by SLA from plastics such as acrylic or epoxy, so as to have inner facing surfaces complementary in shape to the part to be produced indicated at 32. Subsequently, the shells are each back-filled with incompressible material 34 to give two mold halves, which are then provided with ejector holes 36, the mold halves then being as shown in FIG. 4. The incompressible material may be high strength metal filled epoxy, incorporating steel powder, chemically bonded ceramics, or other strong molten-then-solidified materials; these materials produce a solid support for the mold half which is stronger than that obtained by the plastic material used to build the whole mold half by the SLA process. Subsequently, a coating 38 of nickel is deposited on all surfaces of each mold half by electroless plating followed by electro-plating, so that the mold is completely contained inside the metal coating. The coating preferably produces a layer of at least 75 µm thickness. The metal coated mold is shown in FIG. 5. The mold is then used to produce prototype parts by methods similar to those described above for the mold halves of FIG. 2.

In an experiment, the mold of a telephone front panel was built using this method. The time and cost to build the mold was about 20% more than the building cost if the mold had been built by the first method described with reference to FIGS. 1 and 2. However, the resulting mold was much stronger and more durable than that produced according to the first method and the injection cycle was much shorter because this mold could stand higher injection and holding pressures and shorter cooling times.

We claim:

1. A process for making a temporary mold capable of producing several prototype plastic parts, including the steps of:

using computer-aided design to produce a geometric computer model of a prototype part suitable for being molded in plastic;

using said computer model to design and produce a geometric model of a mold that can be used to produce said part;

using said geometric model of the mold in a rapid prototyping system to produce a mold portion from plastic material, the mold portion having an inner surface substantially complementary, to an outer surface of said part, and, simultaneously or subsequently, providing solid support for said mold portion to prevent any flexing of said mold portion in later coating the mold portion inner surface with a layer of metal suitable for electro-plating having a thickness of between 75 and 150 μm, which layer has an inner surface adhered to the mold inner surface and an outer surface of the precise shape and dimensions for forming said plastic parts, thus producing a coated mold portion;

fitting the coated mold portion, including its support, into an injection molding machine.

2. A process according to claim 1, wherein said rapid prototyping system is a stereolithography process.

3. A process according to claim 1, wherein the mold portion includes said solid support formed integrally with the mold portion.

4. A process according to claim 1, wherein said mold portion as produced by the rapid prototyping system is a thin shell, the process including the step of placing said shell in an enclosure and back-filling the shell with backing material which solidifies and provides said solid support for the mold portion during the molding procedure, said backing material being stronger than the plastic material forming the thin shell.

5. A process according to claim 1, wherein said rapid prototyping system is used both for producing a mold portion having a cavity, and for producing a core, also from plastic material, for use with said mold portion.

6. A process according to claim 1, wherein a core formed of metal is fitted into said molding machine along with said mold portion.

7. A process according to claim 1, wherein said mold portion, having been formed by said rapid prototyping system, is subsequently provided with bores for ejector pins.

8. A process according to claim 1, wherein cooling lines for circulation of cooling fluid are provided in said mold portion.

9. A process according to claim 1, wherein said plastic material for forming the mold portion is acrylic or epoxy based resin.

10. A process according to claim 1, wherein said coating step is performed by a combination of electroless and electro plating techniques.

11. A process according to claim 1, wherein the said metal is nickel or copper.

12. A process for making several prototype plastic parts, comprising:

using computer-aided design to produce a geometric computer model of a prototype part suitable for being molded in plastic;

using said computer model to design and produce a geometric computer model of a mold that can be used to produce that part;

using said geometric computer model of the mold in mold portion from plastic material, the mold portion having an inner surface substantially complementary to an outer surface of said part, and, simultaneously or subsequently, providing solid support for said mold portion to prevent any flexing of said mold portion in later operations;

coating the mold portion inner surface with a layer of metal suitable for electro-plating having a thickness of between 75 and 150 μm, which layer has an inner surface adhered to the mold inner surface and an outer surface of the precise shape and dimensions for forming said plastic parts thus producing a coated mold portion;

fitting the coated mold portion, including its solid support, into an injection molding machine, and molding said prototype plastic parts in said molding machine in successive operations under conditions of temperature of less than 600° F. and pressure below 12,000 psi thus allowing several prototype plastic parts to be produced.

13. A process according to claim 12, wherein said rapid prototyping system is a stereolithography process.

14. A process according to claim 12, wherein the mold portion includes said solid support formed integrally with the mold portion.

15. A process according to claim 12, wherein said mold portion as produced by the rapid prototyping system is a thin shell, the process including the step of placing said shell in an enclosure and back-filling the shell with backing material which, in use, is substantially incompressible and provides said solid support for the mold portion, said backing material being stronger than the plastic material forming the shells.

16. A process according to claim 12, wherein said rapid prototyping system is used both for producing a mold portion having a cavity, and for producing a core, also from plastic material, for use with said mold portion.

17. A process according to claim 12, wherein the mold is caused or allowed to cool between said successive operations so that the temperature inside a cavity between the mold portion and a mold core remains at all times below 600° F.

18. A process according to claim 12, wherein said plastic material for forming the mold part is acrylic or epoxy based resin.

19. A process according to claim 12, wherein said coating step is performed by a combination of electroless and electro plating techniques.

20. A process according to claim 12, wherein the said metal is nickel or copper.

* * * * *